(12) United States Patent
Takahashi et al.

(10) Patent No.: US 7,564,591 B1
(45) Date of Patent: Jul. 21, 2009

(54) IMAGE PROCESSING APPARATUS AND IMAGE PROCESSING METHOD

(75) Inventors: Kiichiro Takahashi, Kawasaki (JP); Naoji Otsuka, Yokohama (JP); Hitoshi Sugimoto, Yokohama (JP); Hitoshi Nishikori, Inagi (JP); Osamu Iwasaki, Tokyo (JP); Kaneji Yamada, Tokyo (JP); Minoru Teshigawara, Yokohama (JP); Takeshi Yazawa, Kawasaki (JP); Toshiyuki Chikuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 492 days.

(21) Appl. No.: 09/678,020

(22) Filed: Oct. 4, 2000

(30) Foreign Application Priority Data

Oct. 5, 1999 (JP) ................................. 11-284938

(51) Int. Cl.
*H04N 1/405* (2006.01)
(52) U.S. Cl. ..................................... 358/3.21; 358/3.23
(58) Field of Classification Search ....... 358/3.21–3.23, 358/1.9, 502, 504, 406, 500
See application file for complete search history.

(56) References Cited

U.S. PATENT DOCUMENTS 5,038,208 A * 8/1991 Ichikawa et al. ............ 358/502
5,473,351 A * 12/1995 Helterline et al. ............. 347/19
5,844,581 A * 12/1998 DeJoseph et al. ............. 347/14
6,033,137 A * 3/2000 Ito ............................... 400/74
6,330,050 B1 * 12/2001 Takahashi et al. ............. 355/25
6,612,676 B1 * 9/2003 Minckler ..................... 347/19

FOREIGN PATENT DOCUMENTS

| JP | 4-33470 A | 4/1992 |
| JP | 05-220977 | 8/1993 |

* cited by examiner

*Primary Examiner*—Thomas D Lee
*Assistant Examiner*—Stephen M Brinich
(74) *Attorney, Agent, or Firm*—Fitzpatrick, Cella, Harper & Scinto

(57) ABSTRACT

In a printer, when difference in ejection characteristic among nozzles appears as density non-uniformity and the way of letting the density non-uniformity appear is different depending upon kind of image, proper density correction is performed. Specifically, the kind of image to be printed is judged, and when the kind of image is a halftone image according to the judgment, a density correction table corresponding to the halftone image is selected and used to perform the density correction. Also when the kind of image is judged to be a solid image (without a portion of the halftone image), a proper table is selected similarly and used to perform the density correction.

12 Claims, 12 Drawing Sheets

IMAGE PROCESSING APPARATUS AND IMAGE PROCESSING METHOD

This application is based on Japanese Patent Application No. 11-284938 (1999) filed Oct. 5, 1999, the content of which is incorporated hereinto by reference.

BACKGROUND OF THE INVENTION

1. Field of the Invention

The present invention relates to an image processing apparatus and an image processing method, and specifically to an image processing apparatus for performing correction of density values of image data, correspondingly to each of a plurality of printing elements for a printing apparatus or each of a plurality of rasters constituting the image data corresponding to those printing elements.

2. Description of the Related Art

Conventionally, a printing apparatus for performing printing on printing media, such as papers, OHP (Over Head Projector) sheets, etc. (hereinafter referred to as "printing paper" or simply "paper") employ several printing methods. As apparatuses of such printing methods, the printing apparatus of the wire dot printing, the thermal sensitive printing, the thermal ink-transfer printing, the ink-jet printing and the like are known. Among those apparatuses, the printing apparatus of the ink-jet method ejects ink directly onto the printing paper to perform printing and are used widely as an image output apparatus, such as a printer, a facsimile, a copying machine, etc, because the apparatus of the ink-jet method has various merits such as low noise, a low running cost, easiness of miniaturization and color printing, etc.

It is known that in printing apparatuses of the various methods stated above, there is a problem of density non-uniformity. For example, a print head for the printing apparatus of the ink-jet method generally comprises a plurality of ink ejection orifices (hereinafter also referred to as "nozzle") arranged in a direction of conveyance of a printing medium and through the plurality of ejection orifices ejects an ink droplet while the printing head scans the printing medium, so that printing is performed. In such print head having the plurality of nozzles, differences in an ejection characteristic among the nozzles may be caused due to a slight error in manufacturing the print head and due to aging of the print head. This difference may cause the density non-uniformity such as a black streak, a white streak, or the like in a printed image.

To solve this problem, for example, Japanese Patent Application Laid-open No. 5-220977 (1993) discloses a so-called head shading method. In the method density correction data is prepared for each nozzle and image data is corrected with respect to raster data for each nozzle by means of respective the density correction data so that the density non-uniformity in the printed image can be prevented from occurring.

However, the conventional head shading method is one where the density correction is performed by relating one piece of the density correction data to each printing element. Therefor, in the ink-jet printing apparatus where various printing conditions are used to perform printing, for example, plural kinds of printing modes are used for printing, there may be a case where, depending upon the printing condition, correction data for the density non-uniformity is not suited to the printing condition and hence the density non-uniformity correction based on that correction data may not be properly reflected on the printed image.

For example, in the case of differentiating the printing condition by differentiating kinds of images to be printed, when an image to be printed is a photographic-like pictorial image, most of the image to be printed is a halftone image. Therefore, the variation in the printing characteristic among printing elements may come out as the density non-uniformity in the printed image in a relatively noticeable manner, hence degrading quality of the printed image. On the other hand, when an image to be printed is one that consists of mainly characters and graphics, a portion of a halftone may not exist so much but portions of the so-called solid image (images without a halftone portion) may be most. Therefore, even if the variation in the printing characteristic of the printing elements exist, there may be little influence on the quality of the image. This is because an area factor defined as a covering ratio of a printed dot to a printing paper is intrinsically more than 100 percent for the solid image. Therefor, even if there exists variation in for example ejection quantity among the nozzles serving as printing elements and consequently variation in the dot size formed on the printing paper, it scarcely appears as the density non-uniformity. Contrary to this, in the case of the halftone image, since the above-mentioned area factor is relatively small, if there exists variation in the size of the formed dot, it is likely to appear as variation in the density.

In such cases, it is probable that the correction data determined for each printing element is set in such a way that the correction data is intended to be suited to either one kind of images, or strictly speaking, the correction data is suited to neither kind of images. As a result, it may be a case that correcting of the density non-uniformity using the correction data cannot cause a proper reflection on the printed image, and consequently low-quality printing with the density non-uniformity being remained unsolved is performed. When the correction data is produced, a test pattern is printed. For example, if the test pattern consists of several patches each covering plural levels of the possible gray level, the correction data produced based on these test pattern is what is suited to the halftone image more likely than not.

Moreover, if the correction data is set so that the density correction for the halftone image is performed properly, a density value is overcorrected to an excessively low value and hence the printing dot size becomes extremely small to effect decrease in the area factor when printing the solid image, and conversely the density non-uniformity may occur.

It is needless to say that the printing condition in which the variation in the characteristic of printing elements noticeably comes out as the density non-uniformity is not limited to the above-described conditions. For example, in the ink-jet method, when there exists the variation in ejection direction of the nozzles other than the ejection quantity, it is often the case where the user recognizes the density non-uniformity called a white streak or black streak that is generated by the variation in formation position of the printed dot. In this case, this density non-uniformity doesn't necessarily appear in a noticeably different manner for the halftone image and for the solid image.

Moreover, being in conjunction of this case, not only in the case where the kinds of the image data to be printed are different as described above, but also in the following cases the density appears differently according to each condition; the case where the printing modes, such as a driving frequency of the printing elements when the printing is performed, are different; the case where scan directions of the printing head are different; and the case where the ejection quantity is modified for each nozzle acting as a printing element or the ink density is modified. Also in such cases, if each case has such a configuration similarly that one piece of the density correction data is provided for each printing element or each raster, the density correction may have no proper reflection on the printed image.

SUMMARY OF THE INVENTION

The object of the present invention is to provide an image processing apparatus and an image processing method that can perform proper density correction correspondingly to each of the printing conditions by preparing plural pieces of the density correction data for each printing element or the like, even if the density non-uniformity comes out differently according to the printing condition.

In the first aspect of the present invention, there is provided an image processing apparatus that performs image processing for generating image data to be used for printing by means of printing means, the apparatus comprising;

retaining means for retaining density correction data for each of a plurality of printing conditions between which density appears differently in the printing by means of the printing means;

judging means for judging the printing condition when performing image processing; and density correction means for performing density correction on the image data using the density correction data corresponding to the printing condition judged by the judging means, among the density correction data retained by the retaining means.

In the second aspect of the present invention, there is provided an image processing method that performs image processing for generating image data to be used for printing by means of printing means, the method comprising the steps of;

preparing density correction data for each of a plurality of printing conditions between which density appears differently in the printing by means of the printing means;

judging the printing condition when performing image processing; and performing density correction on the image data using the density correction data corresponding to the printing condition judged by the judging step, among the density correction data prepared by the preparing step.

According to the above construction, in the case that a way in which the density appears in an image printed by printing means differs depending upon printing conditions, density correction data according to the way of appearing of each density is prepared for each printing condition, and then density correction is performed using the density correction data corresponding to the printing condition that has been judged. Thereby the density correction suited to the way of appearing of the density can be performed. As a result, when preparing the density correction data in order to suppress a density non-uniformity property which printing means has correspondingly to the printing condition, the very density correction data for effectively suppressing the density non-uniformity can be selected.

The above and other objects, effects, features, and advantages of the present invention will become more apparent from the following description of embodiments thereof taken in conjunction with the accompanying drawings.

DETAILED DESCRIPTION OF THE PREFERRED EMBODIMENTS

Figure 1:
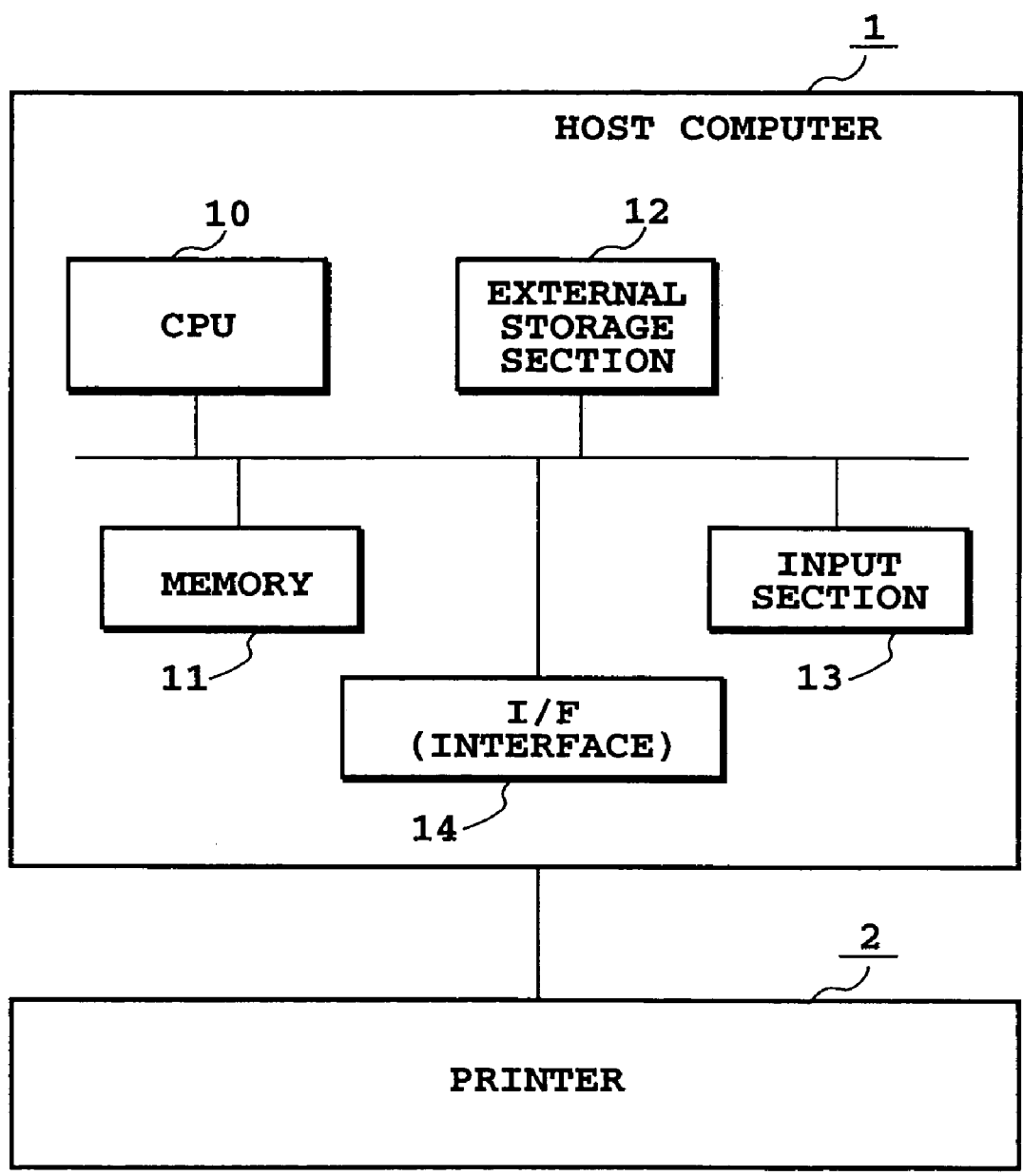
FIG. 1 is a block diagram showing a configuration of an image processing system according to one embodiment of the present invention.

Hereafter, referring to the drawings, the embodiments according to the present invention will be described.

FIG. 1 is a block diagram showing a configuration of an image processing system according to one embodiment of the present invention. The image processing system comprises a host computer 1 acting as an information processor and a printer 2 acting as a printing apparatus.

In FIG. 1, the host computer 1 comprises a CPU 10, a memory 11 such as ROM, RAM or the like, an external storage section 12 such as a hard disk or the like, an input section 13 such as a key board, a mouse, or the like, an interface 14 for the printer 2 and the like. The CPU 10 executes an image processing program stored in the memory 11 to perform image processing on the image data such as color processing, density correction processing, quantization processing (binarization processing) or the like. The image processing program is normally adapted to be stored in the external storage section 12 or is supplied from an external device, as a so-called printer driver. When an application program issues a print command, the image processing program that constitutes the printer driver is transferred from the external storage section 12 or the external device to the memory 11. The host computer 1 is connected with the printer 2 through the interface 14, sends thereto the image data that has been subjected to the color processing, the binarization processing or the like according to the printer driver and makes the printer 2 perform printing.

More specifically, in as case of this embodiment, the host computer 1 is configured so as to execute various image processing on an image data, such as rasterization processing, color conversion processing, the output $\gamma$ processing, quantization processing and the like by means of the printer driver provided for the printer 2, which is set on the host computer 1, convert the image data to be printed into binary data of a bit image form that can be used directly by the printing head of the printer 2, and output the data so converted to the printer 2.

Hereinafter, the above-mentioned various image processing executed on the host computer is referred to as "host development processing."

Figure 2:
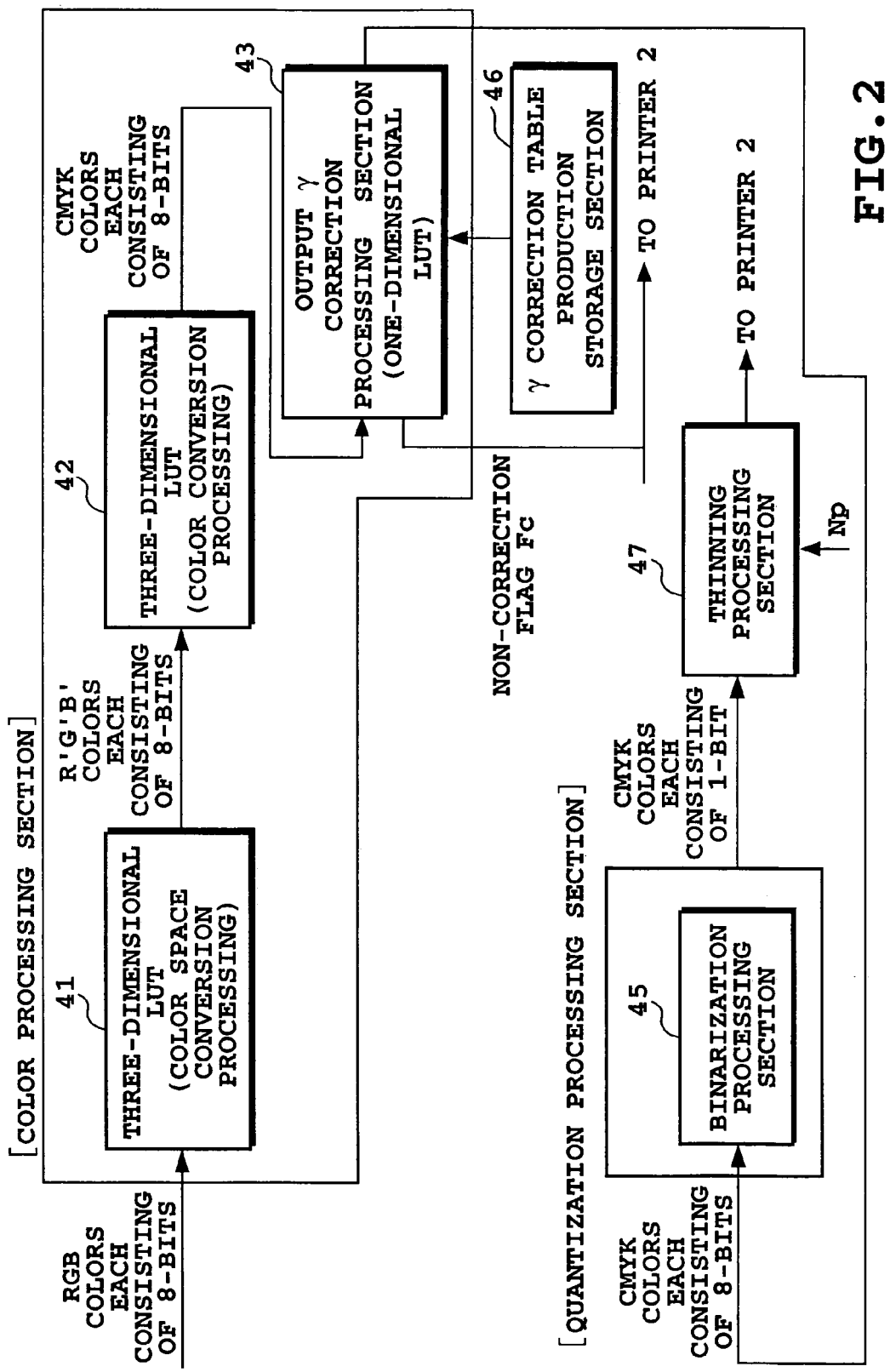
FIG. 2 is a block diagram showing a configuration of a processing of a printer driver in the system.

Next, referring to FIG. 2, functions of a main part of the embodiment such as the host development processing etc. executed by the printer driver of the host computer 1 will be explained. FIG. 2 is a view showing mainly image processing according to the printer driver, with each function part blocked.

In FIG. 2, the host development processing is divided broadly into two processing: the color processing executed by a color processing section 40; and the binarization processing executed by a quantization processing section 44. Two processing cover steps from a step that image data of R (Red), G (Green), and B (Blue) colors each consisting of 8-bits, i.e. 256 gradation levels is given by the application program and the like to a step that the image data is converted into data of C, M, Y, and K colors each consisting of 1-bit binary value and output the binary data.

Moreover, in the host development processing, when multi-pass printing is performed in the printer 2, a thinning processing corresponding to a number of multi-pass $N_p$ is performed at a thinning processing section 47. This multi-pass printing is a printing method where a line of dots to be formed in a scan direction of the printing head, which corresponds to raster data, is printed by means of $N_p$ pieces of different nozzles and therefor that line is scanned $N_p$ times by the print head. Furthermore, similarly, when null skip processing, in which the scanning of the printing head being omitted for a line of no printing, is performed in the printer 2, for the raster before the density correction that is a null raster and therefor that has not subjected to density correction at the output γ correction section 43, that is, for the raster that is one whose data before the density correction are all "0", performed is a process where the non-correction flag $F_c$ (being ON when the correction is not performed) for identifying this status is related to the raster number and sent to the printer 2. This is done because, when the raster is converted into the null raster by the density correction, unlike the case where the raster before processed for the density correction is already the null raster, the correction table has already been assigned to that raster and so it is requisite that a relation between the raster and the nozzle thereafter, namely the relation between the raster and the correction table should be maintained.

The image data of R, G, and B colors each consisting of 8-bits that has been rasterized is inputted into the color processing section 40. The image data of R, G, and B colors each consisting of 8-bits first undergoes color space conversion processing (former part color processing) by means of a three-dimensional lookup table 41 (hereinafter abbreviated to "LUT") and converted into data of R', G', and B' colors each consisting of 8-bits. This color space conversion processing is performed, for example, in order to get rid of a difference between a reproduction color space of a monitor of the host computer 1 and that of the printer 2 as an output device.

The data of R', G', and B' colors each consisting of 8-bits which are obtained through the color space conversion processing is converted into data of C (Cyan), M (Magenta), Y (Yellow) and K (Black) colors each consisting of 8-bits by means of a next three-dimensional LUT 42. This processing is called color conversion processing (latter part color processing) and is for converting the RGB data of an input system into CMYK data of an output system. More specifically, the latter part color processing is for converting input data represented by the three primary colors (RGB) of subtractive mixture of colors into data represented by the three primary colors of additive mixture of colors when is used to represent a color by the reflection of light, such as printers etc.

The three-dimensional LUTs 41, 42 used for the former part color processing and the latter part color processing discretely retain data (lattice point data), and when outputting data other than the lattice point data the two processing perform interpolation processing.

The data of C, M, Y, and K colors each consisting of 8-bits that has undergone the latter part color processing further undergoes the density correction processing (output γ correction) at the output γ correction processing section 43 comprising a one-dimensional LUT. More specifically, normally a relation between a number of printed dots per unit area and an output density characteristic (reflective density etc.) is not a linear relation. Accordingly, the output γ correction is performed so that a linear relation between input levels of the data of C, M, Y, and K colors each consisting of 8-bits and the output density characteristic based on that input levels is made to be improved. In the output γ correction processing of this embodiment, a proper output γ correction table is made to be assigned to each nozzle of the printing head and this correspondence so assigned is also used for the shading correction. Thus, in this embodiment the output γ correction and the shading correction are performed using one table. However, needless to say, separate tables may be prepared for the output γ correction and for the shading correction respectively and the two correction processing may be performed using the respective tables.

In this embodiment, as will be described later, an optimum γ table, as the one-dimensional LUT for output γ correction, is set and stored for each printing condition, such as the kinds of the image data to be printed, the printing modes of the printer 2 (for example, the multi-pass printing etc.) and the like by the γ correction table production storage section 46.

Moreover, when a null skip is done at the printer 2, the output γ correction processing section 43 is configured to judge whether or not each raster is null (consisting of blank (zero) data) based on multi-valued image data before the density correction processing and determine the raster for which the density correction is performed based on the judgment result. Then, a non-correction flag $F_c$ for identifying the raster that doesn't undergo the density correction (this fag being set to ON when the density correction has not been performed) is related to a raster number and outputted into the printer 2.

The multi-valued image data of C, M, Y, and K colors each consisting of 8-bits outputted by the color processing section 40 is inputted to the binarization processing section 45 of the quantization processing section 44. In the binarization processing section 45, the inputted multi-valued image data of C, M, Y, and K colors each consisting of 8-bits is quantized into binary data of C, M, Y, and K colors each consisting of 1-bit using a well-kwon error diffusion method.

The thinning processing section 47 is one that functions when the multi-pass printing is performed. The section functions in such a way that binary data for each raster outputted by the binarization processing section 45 is thinned based on a duty corresponding to the number of multi-pass $N_p$ (for example the duty being 50 percent for the number of passes $N_p$ of 2) and the data so thinned is outputted to the printer 2 $N_p$ times.

It is explained that a series of the image processing mentioned above is executed in the host computer in this embodiment. However, it is needless to say that way of executing the processing is not limited to this form. For example, in printers, copying machines and the like that take in the image data directly from a scanner and a digital camera and print out it, all the processing explained above can be executed in the output device of those apparatuses, such as printers etc. Alternatively, part of the above mentioned process may be executed by the printer etc. Especially the processing executed by the thinning processing section 47 is relatively light in the processing load and can be easily executed by the printer. The present invention includes all the forms stated above, and in this specification the following apparatuses are called "image processing apparatus": an apparatus for executing the series of image processing including the output γ correction processing (density correction processing) which will be explained in description of various embodiments; and a plurality of apparatuses that collectively performs those processing.

Figure 3:
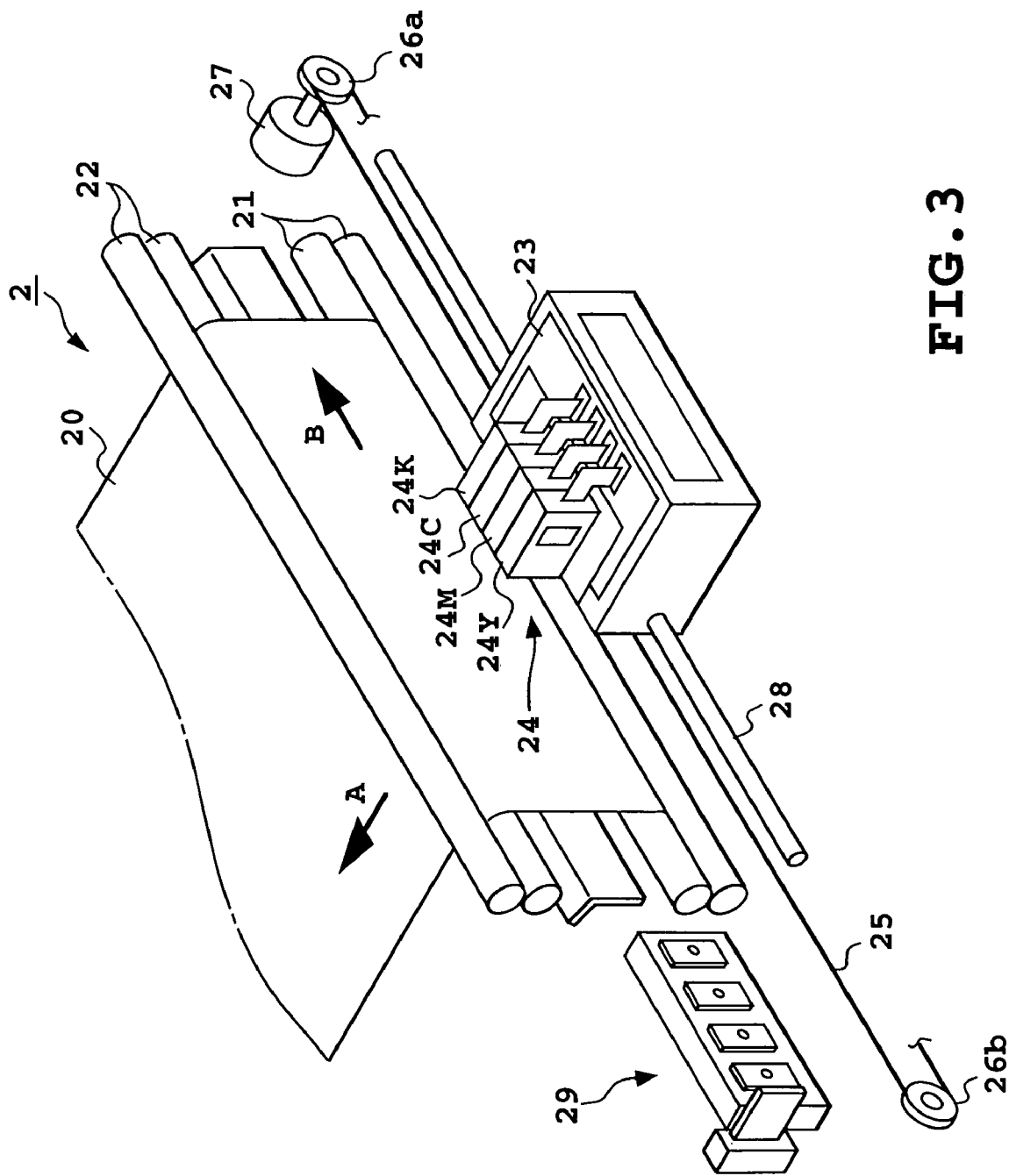
FIG. 3 is a perspective view showing an outline construction of a printer which constitutes the system.

FIG. 3 is a perspective view showing mainly a construction of a mechanism part of the printer 2.

A printing medium 20 such as a paper, a plastic sheet, etc. is supplied by feeding rollers (not shown in the figure) one sheet by one sheet and conveyed toward a direction of the arrow A in the figure by means of a first conveyance roller pair 21 and a second conveyance roller pair 22 which are arranged with a certain spacing therebetween. These roller pairs 21, 22 are driven by a stepping motor not shown in the figure.

A carriage 23 is equipped with an ink-jet printing head 24 and ink tanks (not shown in the figure). In the example shown in the figure, the printing head 24 is for color printing and composed of four heads 24Y, 24M, 24C, 24K corresponding to yellow, magenta, cyan, and black colors. A driving force of a carriage motor 27 is transmitted to a carriage 23 through a belt 25 and pulleys 26a, 26b, and thereby the carriage 23 is made to move along a guide shaft 28 in a direction of the arrow B in the figure, which enables the printing heads 24Y, 24M, 24C, 24K to scan the printing medium 20.

In each of the printing heads 24Y, 24M, 24C, 24K, a plurality of nozzles are aligned in a line along a direction parallel to the paper conveyance direction A and these plurality of nozzles are made to eject ink droplets, respectively. In this case, in each ink path corresponding to each nozzle provided are two electro-thermal conversion elements each of which generates thermal energy used for ejecting the ink. By applying predetermined voltage pulses on each of electro-thermal conversion elements, a bubble is generated in the ink to effect ejection of the ink.

By the above configuration, the printing head 24 can eject ink in response to an ejection signal based on the image data while scanning the print head along the direction of the arrow B to form an image etc. with the ink dots on the printing medium 20. At a home position located at one end of a movable region of the printing head 24, provided is a recovery device 29. At the time of non-printing etc., the printing head 24 moves to the home position and the recovery device 29 performs a predetermined recovery processing. The recovery device 29 is equipped with a suction mechanism for sucking the ink from a cap and the print head through the cap, whereby the ink that thickened due to evaporation of the ink in each nozzle of the printing head can be removed. When printing of one band corresponding to array width of the nozzle is completed by the scanning of the printing head 24, paper conveyance (pitch transfer) by the predetermined amount is conducted by the conveyance roller pairs 21, 22. By repeating those operations, the printing is performed on the whole printing medium 20.

Figure 4:
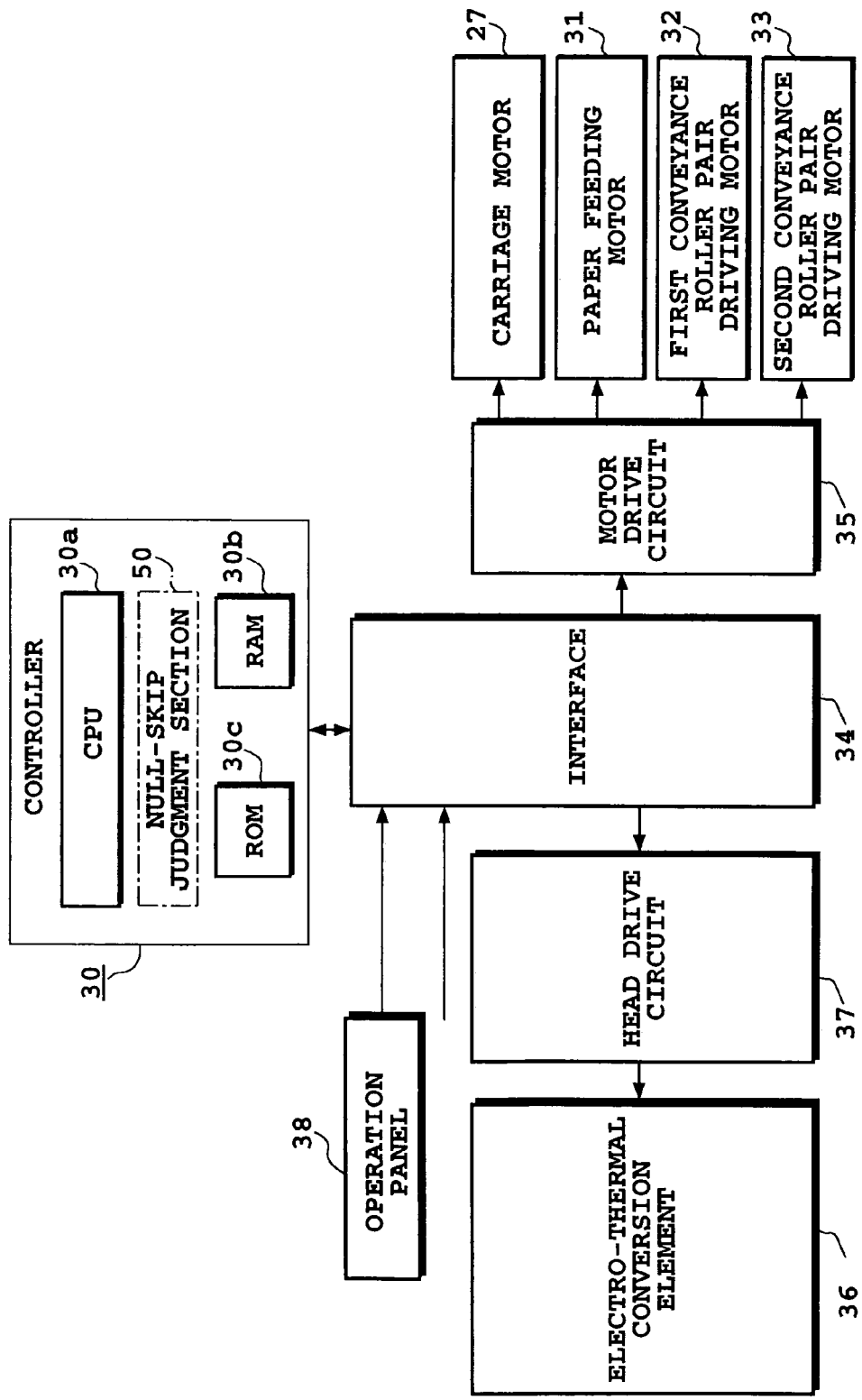
FIG. 4 is a block diagram showing mainly a control system of the printer.

FIG. 4 is a block diagram showing the configuration for control of the printer 2 mentioned above.

In this control system, a controller 30 is provided with a CPU 30a such as, for example, a microprocessor and the like; ROM 30c for storing a control program that the CPU 30a executes, which will be described referring to FIG. 5 and succeeding figures, and various data; RAM 30b serving as a work area when the CPU 30a executes the processing and also temporarily saving various data such as the image data inputted by the host computer 1; and the like. Further, the printer 2 is provided with a plurality of motors, such as a carriage motor 27, a paper feeding motor 31, a motor 32 for driving the first conveyance roller pair, a motor 33 for driving the second conveyance roller pair, etc. and each of those motors is made to operate by the control of the controller 30 through an interface 34 and a motor drive circuit 35.

In each nozzle of each printing head 24 provided are two electro-thermal conversion elements, as described above. Those two electro-thermal conversion elements 36 are driven to be ON or OFF in response to an ejection signal based on control of the controller 30 through the interface 34 and the head drive circuit 37. More specifically, respective driving of the two electro-thermal conversion elements are combined at each nozzle, so that the ink ejection amount can be controlled at plural levels.

The controller 30 receives various print information (for example, character pitch, a kind of character, etc.) from an operation panel 38 though an interface 34 as well as receives the image data from the host computer 1 through an interface 34.

Also, the controller 30 of the printer 2 is provided with a null-skip judgment section 50. The null-skip judgment section 50 judges as to whether the raster is one that the null skip is to be executed, by referring the binary image data inputted by the host computer 1 and the above-mentioned non-correction flag. More specifically, for each raster, the null-skip judgment section 50 refers to the non-correction flag $F_c$ tagged to the raster. Then, when the flag is "OFF," the null-skip judgment section 50 regards that the raster becomes the null raster through the execution of the density correction and tries not to skip that raster. Through this process, it is made possible that such a raster that whole of the raster becomes null data by the density correction processing is prevented from being skipped and actual correspondence of the density correction table which has been assigned to each nozzle or each raster is not deprived.

Moreover, when the printer 2 performs the multi-pass printing as one embodiment of the present invention or as one printing mode in the embodiment, the controller 30 controls the multi-pass printing based on the thinned image data and the information of the number of passes $N_p$ sent from the host computer 1.

In this case, it is necessary for the host computer 1 to send the thinned data based on the number of passes $N_p$, as described above, to the printer 2 so that the multi-pass printing is made to be executed. Further more, the host computer 1 simulates the multi-pass printing that is to be executed by the printer 2 based on the following information.

(a) Total number of the nozzles for use $N_n$ of the printing head in the printer 2 connected to the host computer.

(b) The number of passes of the multi-pass printing (division number of nozzles in the printing head) $N_p$. Acquisition of the total number of the nozzle for use $N_n$ is achieved by a process where the printer 2 is made to store data regarding this number $N_n$ beforehand and the host computer 1 receives this stored data $N_n$ from the printer 2. As for the form of the printer, there are a form in which the printing head is not changed (including a case where only an ink cartridge is changed) and a form in which a printing head can also be changed. It is recommended that in the former case, a main body of the printer 2 is made to store the data concerning the number of nozzles $N_n$, and in the latter case the printing head is made to store the data concerning the number of the nozzles $N_n$. Moreover, there may be other form where a table that stores information concerning the total number of nozzles $N_n$ for each type of the printer 2 or for each type of the printing head is prepared in the host computer 1 and the host computer 1 receives information of the printer type or the head type from the printer or the printing head, whereby the host computer can identify the total number of the nozzles of the printing head used in the printer 2 that is connected to the host computer.

As for the number of multi-pass $N_p$, the host computer 1 is configured in such a way that a user is expected to determine it by direct or indirect selection through a user interface (UI) picture displayed by the printer driver of the host computer 1. For example, in a picture for selecting the printer mode in the above-mentioned UI picture, there is a part for selecting the print mode such as text/table, DTP printing, image processing or the like. When the user selects an appropriate print mode in the selection picture, the number of multi-pass $N_p$ is uniquely determined as one among the one pass, the two pass, the four pass, and the like. That, is, in the processing by a printer driver, the printer driver can refers to memory which stores beforehand a corresponding relation between the number of multi-pass $N_p$ and the print mode, selects the number of multi-pass $N_p$ corresponding to a selected printer mode, and sends this number of multi-pass $N_p$ so selected to the printer 2 to effect the execution of the multi-pass printing. In this embodiment, the printer driver executes the thinning processing and assignment of the amount of paper conveyance. However, the printer 2 may execute the thinning processing and the assignment of the amount of paper conveyance by the host computer's informing the number of multi-pass $N_p$ to the printer 2.

Further, in the case where the multi-pass printing is performed, the output γ correction can take the following several forms. In the embodiments of the present invention, as will be described later, a plurality of such output γ correction tables are prepared corresponding to the respective nozzles or rasters.

The first form of the correction table is one such that for all the printer types which the printer driver covers, standard correction tables corresponding to all combinations of the number of nozzles $N_n$ and the number of multipass $N_p$ are set and stored beforehand in order that the printer driver can refer thereto, and the correction table corresponding to both the information of the number of nozzles $N_n$ obtained from the printer 2 and information of the number of multi-pass $N_p$ obtained as described in the foregoing is selected.

The second form is for the case where the printing head is not changed as described in the foregoing and is one such that a plurality of the correction tables for the multi-pass printing corresponding to the printing head of the printer concerned are stored in memory of the printer body correspondingly to the number of the nozzles $N_n$ and the number of the multi-pass $N_p$ at the time when the printer is shipped from a factory. On the other hand, the second form in the case where the printing head is changed is one such that a plurality of the correction tables for the multi-pass printing corresponding to the print head concerned are stored, for example, in memory of the print head module which has been constituted with an ink tank and the printing head to be changed, correspondingly to the number of multi-pass $N_p$ at the time when the printer is shipped from the factory. In these second forms, the host computer 1 selects one correction table corresponding to the multi-pass printing to be executed among correction tables stored in the printer or the printing head thereof and receives the selected correction table from the printer 2.

The third form is one such that first of all plural kinds of the correction tables (having different data) obtained in the first or the second forms stated above are prepared and test patterns corresponding to respective γ tables are printed by making the printer perform the multi-pass printing using the image data that has been subjected to γ correction by means of respective tables. Then the user selects a printed test pattern having the best printing quality among a plurality of printed test patterns and the host computer adopts the correction table corresponding to this selected test pattern. Alternatively, the following process may be taken: a test pattern consisting of patches which cover plural levels of the possible gradation levels is printed by the multi-pass printing and the printed test pattern is read by means of a scanner to obtain the density for each raster, whereby output γ correction tables that are optimum for each raster is produced based on the readout results.

In this third form, after the printer was shipped from the factory, the γ tables can be changed, so that the printer can deal with the variation due to aging in the ejection characteristic of the nozzles. This embodiment adopts this third form; therefore, as is shown in the following several embodiments, test patterns are printed corresponding to various printing conditions and a plurality of output γ correction tables are set for each nozzle or each raster based on the printed results.

In response to various settings of the multi-pass printing executed by the host computer 1, the printer 2 executes control of drive of the printing head based on binary image data inputted from the host computer 1 that has undergone the density correction and the thinning processing, and at the same time executes control of conveyance of a printing medium using a value of $N_n/N_p$, the number of nozzles $N_n$ divided by the number of multi-pass $N_p$ specified, as one pitch.

As described above, even when the printer 2 executes the null slip, the host computer 1 needs information about this null skip. More specifically, in the correction processing by the output γ correction section 43, as described above, it is necessary to assign the correction table to each nozzle or each raster, and for this purpose the host computer needs to know the minimum number of skip rasters in the printer. For this minimum number of skip lines, there are that of 1-raster, that of 8-rasters, that of the number of nozzles of the printing head, that of the number of rasters corresponding to a value of the number of nozzles Nn divided by the number of passes $N_p$, $N_n/N_p$ (in the case of performing the multi-pass printing), etc. Therefore, the printer 2 is made to store the data concerning this minimum number of skip lines m beforehand, and the host computer 1 receives this stored data m from the printer 2. It should be noted that for the printer where the minimum number of skip lines has been determined uniquely according to the print modes such as text/table printing, DTP printing, image processing, etc., there is no need for receiving the information for the minimum number of skip raster lines from the printer 2. Moreover, since the processing content of the output γ correction at the time of the null skip differs according to the minimum number of skip lines m, the printer driver of the host computer 1 is made to store each output γ correction processing program corresponding to each of those minimum numbers of skip lines in a referable condition, and the host computer 1 executes the output γ correction processing corresponding to the minimum number of skip lines of the printer concerned that is obtained from the printer 2.

In the printers explained above, hereafter several embodiments where a plurality of density corrections are performed for each nozzle or for each raster will be described in a more concrete manner.

First Embodiment

A first embodiment according to the present invention is featured that a plurality of density correction tables are provided for each nozzle in accordance with kinds of images to be printed and the correction table is selectively used according to the kind of image to be printed for performing the density correction, so that density non-uniformity can be suppressed properly.

This embodiment is for a case where there exists a variation mainly in an ejection amount among nozzles of the printing head, which results in the variation in the dot size formed, and thereby the density non-uniformity occurs. In this case, images to be printed include various kinds of images, such as texts, tables, DTP printing, image processing (pictorial image), etc. As described above, for example, the pictorial images having a photographic taste are mostly the halftone images and hence the above-mentioned variation in the dot size affects the printed image largely. On the other hand, the images mainly for the characters and graphics scarcely include the halftone images but virtually includes only solid image, and hence the variation in the dot size don't affect the printed image so much. Moreover, in the case that a correction table that requires excessive reduction of the density is set and the density correction according to the table is performed, the area factor in the solid image may become insufficient, which inversely induces a bad effect of the image such as the density non-uniformity etc. Therefore, for such solid image, the excessive density correction may have an adverse effect.

According to this embodiment, a fact that degree of the density correction should be different depending upon the kinds of images, as in the above, is considered and then two kinds of the density correction tables (output γ correction tables) are provided corresponding to one nozzle or, in the case of the multi-pass printing, one raster, that is, the density correction table for the halftone image and that for the solid image are provided. Then, the image data to be printed is judged to find which kind of image the image data is, according to the judgment a proper density table is selected from the two kinds of the density correction tables, and an optimum density correction for the image is performed.

The settings of two kinds of the correction tables for each nozzle or each raster are carried out based on the readout results of the test patterns printed similarly to the setting of the above-described γ correction table regarding the multi-pass printing. However, in the case of this embodiment, the test pattern consisting of patches in accordance with the kind of above-mentioned image is printed. Then the pattern is read by a scanner, and respective γ correction tables are set based on readout results. Concretely, in the setting of the correction table for the halftone images, a test pattern consisting of a plurality of patches which covers plural levels of the possible gradation levels is printed. On the other hand, in the setting of the correction table for the solid images, a test pattern consisting of patches of the solid image whose dot duty is close to 100 percent is printed. Then, based on those readout results, proper correction tables are produced. However, in the setting of the correction table for the halftone images, since the halftone image is printed by the multi-pass printing, as explained in the third form described above, the above-mentioned test pattern is printed based on the number of nozzles $N_n$ and the number of passes $N_p$ that have been set.

Moreover, judgment of the kind of image can be done based on data form that the application program handles with. For example, character data and a line drawing can be judged to be the solid images, whereas bit map data can be judged to be the halftone image. Alternatively, the judgment can be done using the well-kwon image extraction method. For example, extraction of an isolated point or detection of continuos dots are conducted, and when the isolated point or discontinuous dots is detected, the judgement that image to be the halftone image can be made.

Figure 5:
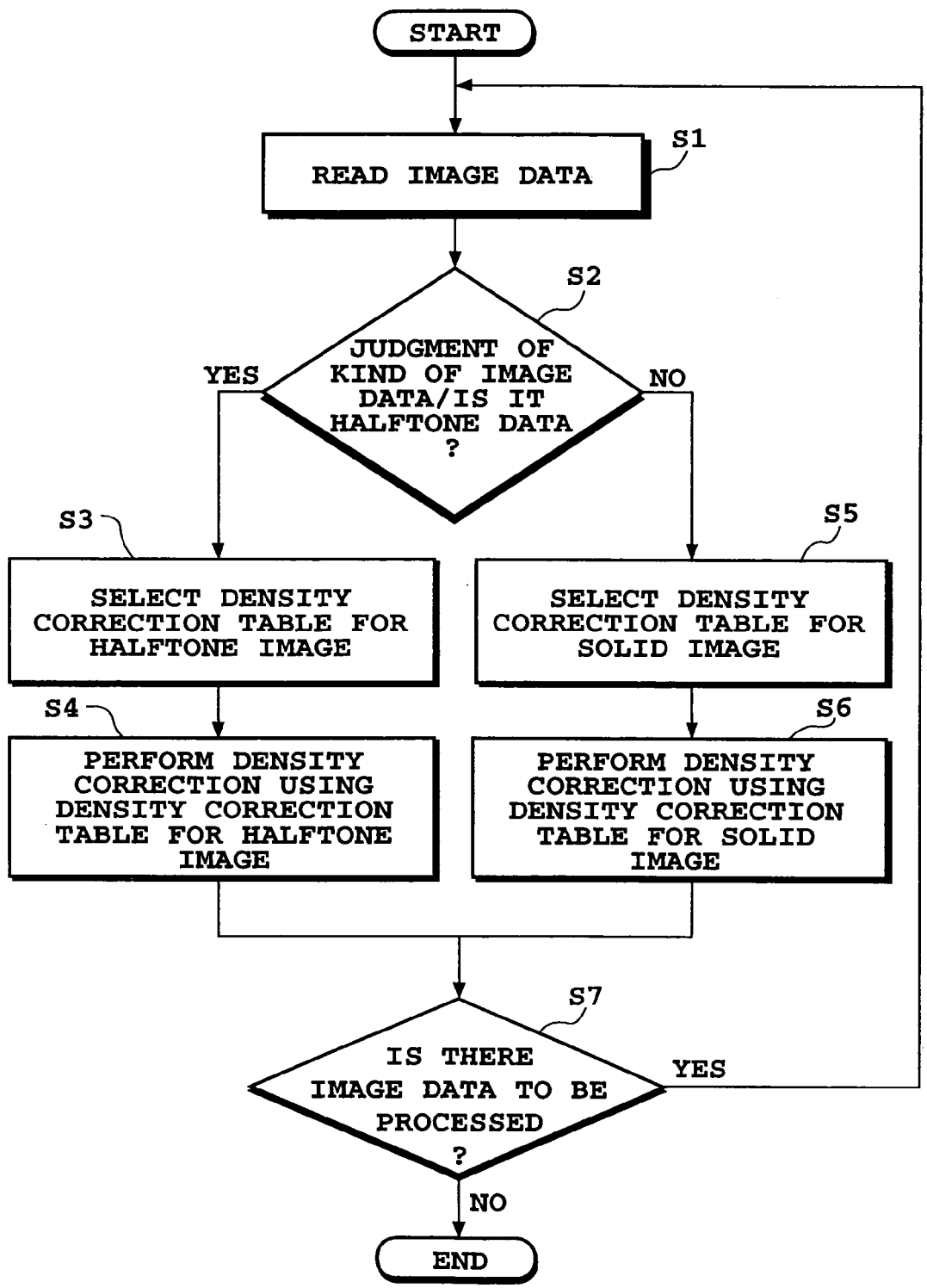
FIG. 5 is a flowchart showing output $\gamma$ correction processing according to a first embodiment of the present invention.

FIG. 5 is a flowchart showing a concrete algorithm for the density correction processing according to this embodiment executed mainly by the output γ correction processing section 43.

First, at step S1, the image data to be processed is read and inputted. The input of the image is done in a unit of the raster, and in this embodiment, the inputting is conducted in unit of 16-rasters in accordance with the number of nozzles of the printing head. Moreover, for the inputted image data, the information representing the kind of image, which is obtained by the above-described judgment, is tagged to a predetermined area the information beforehand and based on this information whether the image data is the halftone image data or the solid image data is checked at the next step S2.

At this step, when the kind of inputted image is judged to be the halftone image, at step S3 the density correction table for the halftone image that has been set beforehand as described above is selected for each nozzle (in the case of one-pass printing) or for each raster (in the case of multi-pass printing), and at step S4 this selected density correction table for the halftone image is used to perform the density correction of the image data that corresponds to each nozzle or each raster.

On the other hand, when at step S2 the kind of inputted image is judged to be not the halftone image based on the image information tagged to the raster, at step S5 the density correction table for the solid image is selected and at step S6 this selected density correction table for the solid image is used to perform the density correction of the image data.

After the above-mentioned density correction in accordance with the respective kinds of images, at step S7 whether or not the image data to be processed exists is checked, and if so, the processing returns to step S1 and repeats the subsequent processing. If no image data to be processed exists, the processing is terminated.

In the foregoing description, judging the kind of image data to be processed is performed for each raster. However, it should be noted that the extraction of the image may be conducted for each block of the predetermined size of the raster and the judgement of the halftone image etc. may be conducted for each block.

Moreover, the judgment and the correction according to the judgment are performed by drawing the line between the halftone image and the solid image. However, the kind of image are not limited to those two, but, for example, the judgment may be conducted for the characters and the line drawings. The basic correction processing algorithm in this case is the same as that of the flowchart shown in FIG. 5.

Second Embodiment

A second embodiment of the resent invention is for performing a plurality of density corrections according to a plurality of printing modes, for each nozzle or for each raster.

Concretely, the second embodiment relates to the density correction of the image data supplied to the printer having the printing mode of one-pass printing and the printing mode of multi-pass printing. In this case, for example, when the same image is printed by each of the above-mentioned different printing modes, there may be a case where the forms of the density non-uniformity come out are different. More specifically, in the one-pass printing mode, the dots in one raster are printed with the ink ejected from one nozzle, whereas in the multi-pass printing mode, the printing of one raster is decomposed into a plurality of scans and dots in one raster are printed by a plurality of different nozzles, respectively. As a result, naturally the number (kind) of nozzles serving for printing the raster is different between these modes, a ejection period (driving frequency) of one nozzle is different between the modes, and in the multi-pass printing mode the ejection period generally becomes longer. When the ejection periods are different from each other like this, the very ejection period affects an output density characteristic. Specifically, in the case that the period concerned is in a predetermined region of stable ejection, the longer the period, the less the ink ejection amount, and hence an output density may decrease. Moreover, contrary to the above case, when the period is in an unstable region of ejection, that is, the ink is ejected while the ink is supplied insufficiently or the like, the longer the ejection period, the more the ink ejection amount because of stabilization of the ejection, and hence the output density may increase.

Figure 6:
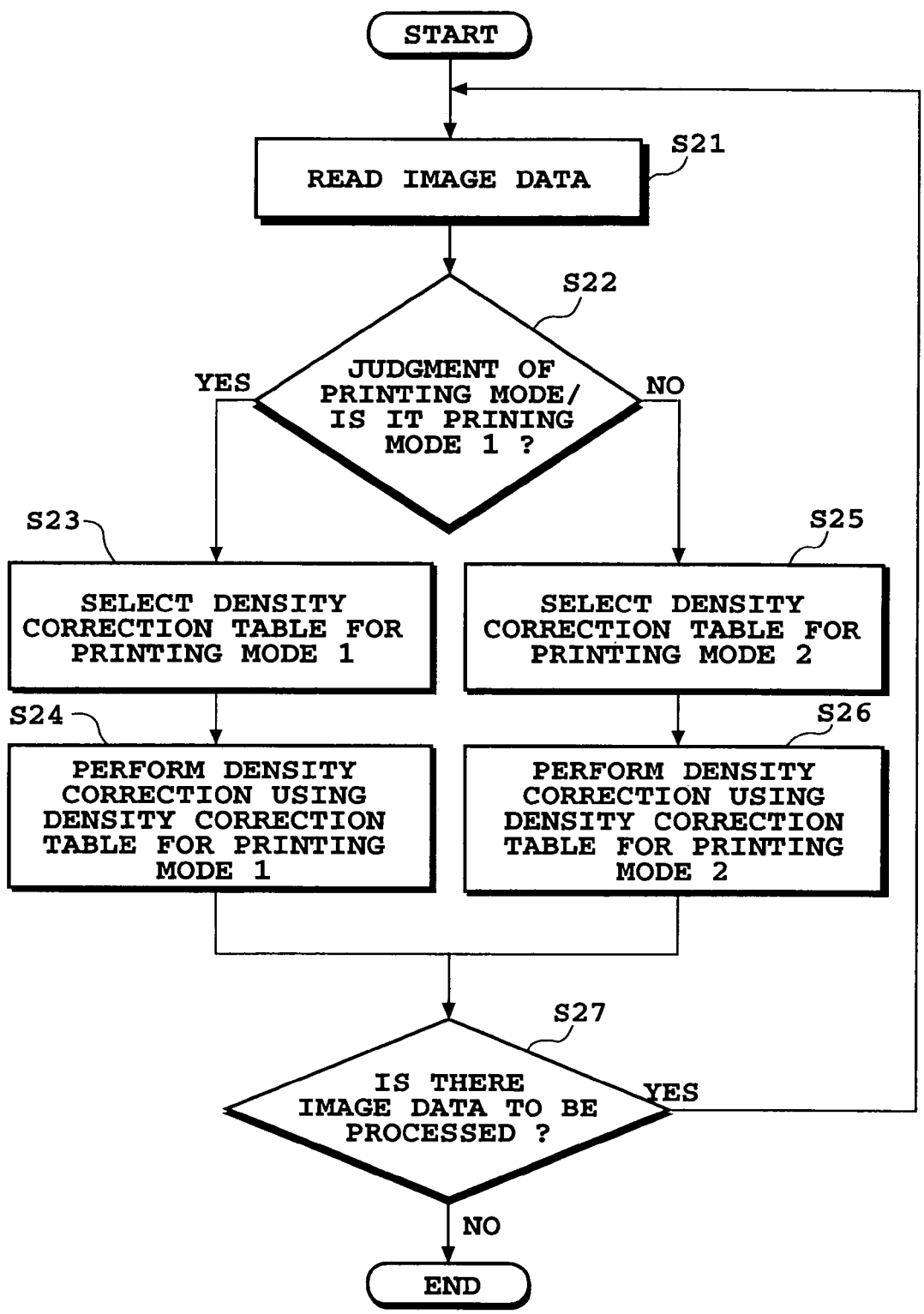
FIG. 6 is a flowchart showing the output $\gamma$ correction processing according to a second embodiment of the present invention.

This embodiment considers that the density characteristic depends upon the printing modes, prepares the output γ correction tables according to respective printing modes to perform the optimum density correction. FIG. 6 is a flowchart showing the density non-uniformity correction processing of this embodiment, which is executed mainly by the output γ correction processing section 43.

Similarly to the first embodiment, at step S21 the image data to be processed is read. Here, any image data that is dealt with in this embodiment is data such that the printing mode has been specified beforehand by an instruction through the printer driver etc. and is stored as header information of the read image data. At step S22, as to the read image data, the printing mode is judged based on the header information. When the printing mode is Printing mode 1 related to the one-pass printing, at step S23 the density correction table for Printing mode 1 is selected for each nozzle and at step S24 the output γ correction is performed for each nozzle by means of this table. On the other hand, when at step s22 the printing mode is judged to be Printing mode 2 related to the multi-pass printing, at step S25 the density correction table for Printing mode 2 is selected for each raster and at step S26 the density table for Printing mode 2 is used to perform the density correction for raster data corresponding to the table in the image data. Then, until all the image data to be processed have been processed, the processing step S1 and the subsequent steps is repeated (step S27).

The tables corresponding to Printing modes 1 and 2 are expected to be set based on the test patterns that are printed beforehand by respective printing modes, as described above.

The above-mentioned processing is explained as one where the judgment and the correction according to the judgment are performed for the two printing modes. However, also in the case where three or more printing modes exist, the density correction can be performed by the similar processing. Moreover, not only in the case where the printing mode is divided in terms of the one-pass printing and the multi-pass printing, but also in the case where the printing mode is divided simply in terms of the driving frequency with the same number of pass, the similar processing can be performed. As described above, here the "printing mode" is one that can be differentiated in terms of the number of the printing pass, the driving frequency, etc. and signifies any printing condition such that depending upon the setting thereof, an output density characteristic differs for each nozzle despite of the same printing head in use.

Third Embodiment

A third embodiment of the present invention is for adopting difference of printing direction along which the printing head scans as the printing condition of the printer and performing the density correction that is different for each nozzle or for each raster according to that difference.

In this case, when the same images are printed by the printer that performs bi-directional printing with a forward scan and a backward scan, the outputted image may have different density characteristic or different density non-uniformity depending upon the printing direction. This is caused by the characteristic of the printing head, and a main reason is that the dot diameter formed with a landed ink may vary especially depending upon flight direction of a satellite ink droplet when the ink is being ejected. More specifically, when a landed point and the flight direction of the satellite ink droplet are the same as those of the main droplet of the ejected ink, the diameter of a formed dot becomes relatively small. However, when the flight direction of the satellite ink droplet differs from that of the main ink droplet and the landed positions of the two droplets are deviated to each other, the dot diameter becomes relatively large. Then, because of the difference of the dot diameter, even when the same image is printed, the output density characteristics or the density non-uniformity for two cases may differ from each other. Especially, in a density area whose area factor has not sufficient value, such tendency of the difference becomes significant. Moreover, in the images whose area factors have sufficient values, such as the solid image etc., almost no difference in the density characteristic can be observed.

Figure 7:
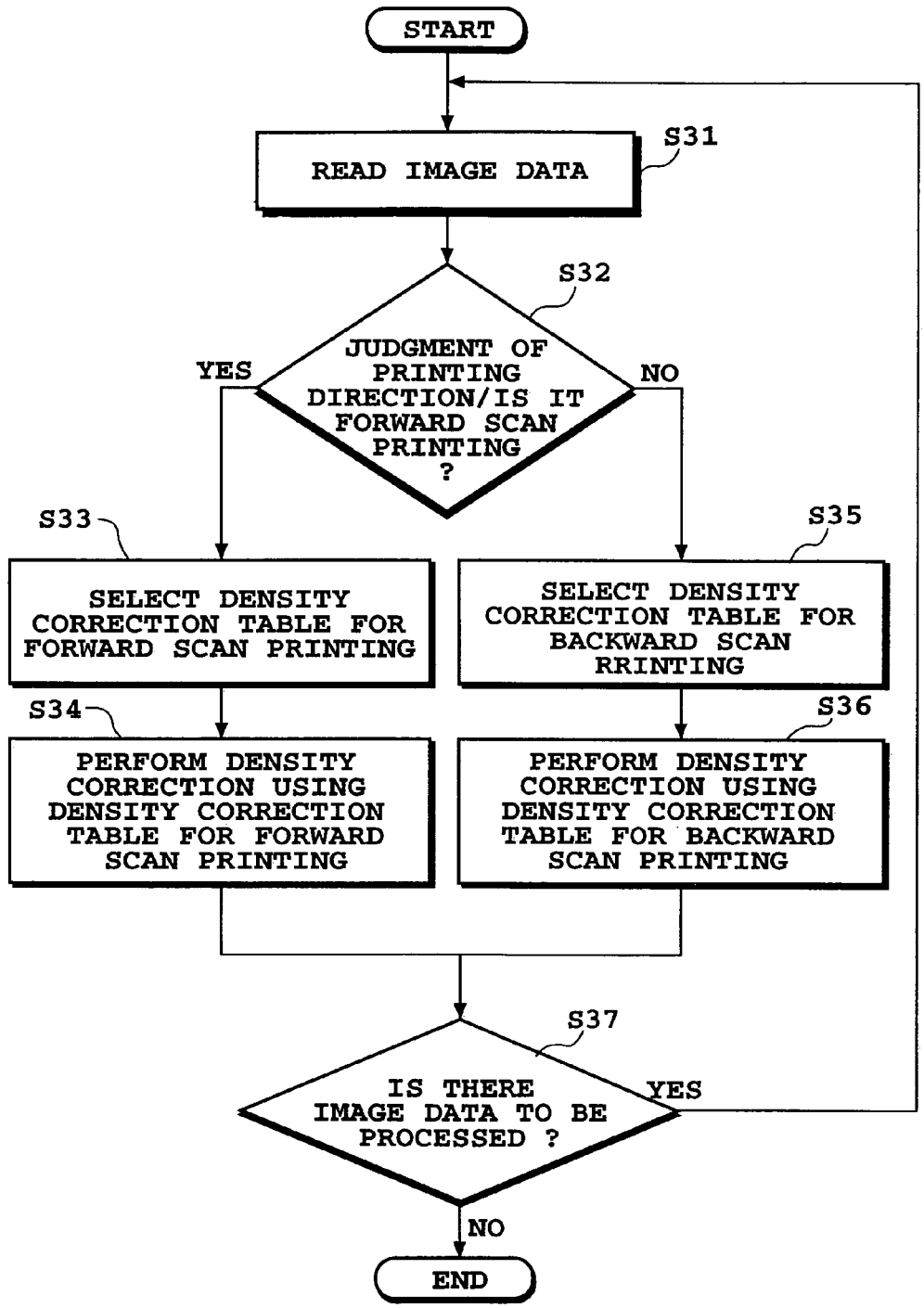
FIG. 7 is a flowchart showing the output $\gamma$ correction processing according to a third embodiment of the present invention.

FIG. 7 is a flowchart showing the output γ correction processing, in which the above-mentioned printing direction of this embodiment is considered, and which is executed mainly by the output γ correction section 43.

Similarly to the above-mentioned embodiments, the image data to be processed is read (step S31). Then the printing direction is judged (step S32). In this embodiment, in the case that the printer driver of the host computer performs the image processing on the image data to be handled with, the host computer can simulate the operation of the printer 2 and judge the scan direction of the printing head when the printer 2 performs the printing.

When at step S32 the printing operation is judged to be the forward scan printing, at step 33 the density correction table for the forward scan printing is selected for each nozzle (in the case of one-pass printing) or for each raster (in the case of multi-pass printing). Specifically, for example, in the case where the dot is printed with a small area due to the influence of the satellite ink droplet, the table is selected for performing the correction so as to increase the density. Then, at step S34 using this correction table, the image data is corrected for each nozzle or for each raster. On the other hand, when at step S32 the printing operation is judged to be the backward scan printing, the density correction table for the backward scan printing is selected for each nozzle or for each raster (step 35), and at step S36 using this correction table for the backward scan printing, the image data is corrected for each nozzle or for each raster. Finally at step S37, the flow judges whether or not the image data exists, and if so, the above-mentioned processing is repeated.

The setting of the correction table in this embodiment is carried out, similarly to the above-mentioned two embodiments, in such a way that the test pattern is printed for each printing condition and the table data is produced based on the readout results thereof.

As described in the first to third embodiments in the foregoing, the plurality of density correction tables are prepared for respective printing elements or for respective rasters and using separately the correction table corresponding to each printing condition the density correction is performed, so that the density non-uniformity can be suppressed. In the above-mentioned embodiments, the printing conditions are explained to be the kinds of images, the printing modes, and the directions of printing. However, the present invention is not limited to those printing conditions. Further the same processing may be conducted for a set of a plurality of printing conditions each of which has an influence on the way of letting the density appearance in the printed image, that is, which changes the ink ejection amount or the dot diameter. Then the printing condition may be judged, whereby proper density correction for the plurality of printing conditions can be performed. Moreover, by performing the plurality of density correction properly, the operator can also achieve an effect that an induced bad effect on the image arising from excessive density correction is successfully suppressed.

Fourth Embodiment

A fourth embodiment of the present invention is for suppressing the density non-uniformity in gradation printing, in which the printing dot size formed by a single printing element can be modulated. Similarly to above embodiments, a plurality of density correction values in accordance with the above-mentioned dot sizes for each printing elements are provided and the density correction is performed for each printing element using the correction values for respective dot sizes, so that the density non-uniformity can be suppressed.

Here, as gradation printing methods for modifying the dot size, in the bubble jet printing, there exist: a method where each nozzle of a printing head is equipped with a plurality of electro-thermal conversion elements and the ink ejection amount is modulated by controlling the number of the electro-thermal conversion elements to be driven, whereby the formed dot size is varied; a method where a plurality of nozzles which eject ink droplets having different amount of volume, respectively are assigned to one pixel; etc.

For example, in the former method, the ink ejection amount is controlled to be either of two ways: one way where a relatively small amount of ink is ejected by driving an electro-thermal conversion element having a relatively small area of heat generation; and the other way where a relatively large amount of ink is ejected by driving the electro-thermal conversion element having a relatively large area of heat generation. Here, when a dot produced with the small ejection amount of ink is called a "small dot" and a dot produced with the large ejection amount of ink is called a "large dot", the output density characteristic is shown in FIG. 8 where the output density characteristic differs in two ways based on the large dot and the small dot.

Figure 8:
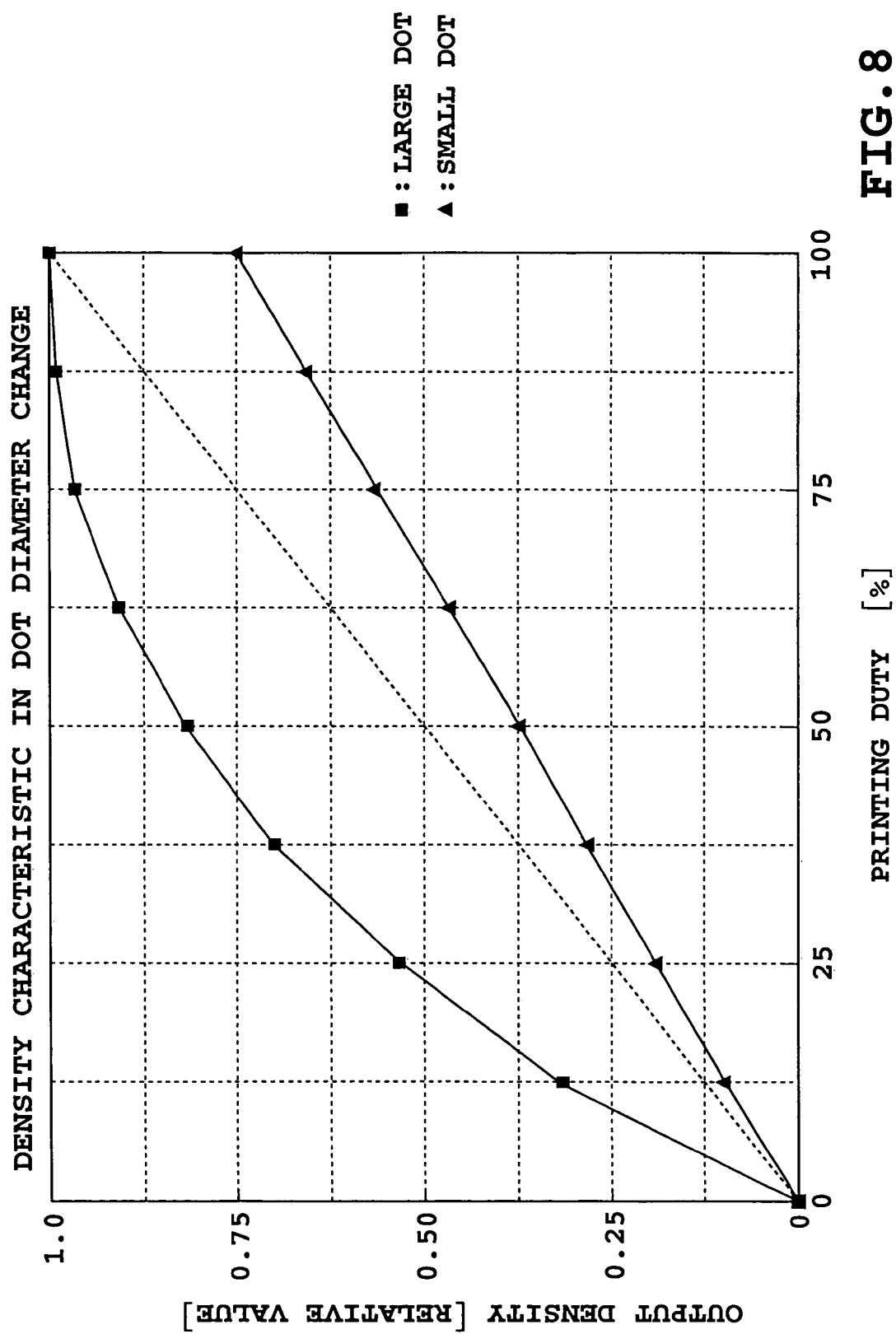
FIG. 8 is a diagram showing an output density characteristic according to a diameter modulation for different dot sizes of large and small as a function of a printing duty in a fourth embodiment of the present invention.

FIG. 8 is a diagram showing one example of a relation between the printing duty, that is, a number of the ink droplet-landed on a single pixel and the density achieved by that printing duty. The density shown in the figure indicates a relative value to the output density measured when the large dot is printed with a duty of 100 percent.

As shown in this figure, density characteristic for the large dot shows a non-linear characteristic: the output density increases rapidly at a relatively low duty and reaches a saturation state before a duty of 100 percent. On the other hand, the density characteristic of the small dot shows a linear property: the output density increases linearly with increasing duty. Moreover, when the printing is performed with a duty of 100 percent, the output density is lower compared to that for the large dot in the same condition.

As is understood from the relation shown in FIG. 8, the density characteristic depends upon the dot size. This phenomenon is explained referring to FIGS. 9A and 9B.

Figure 9A:
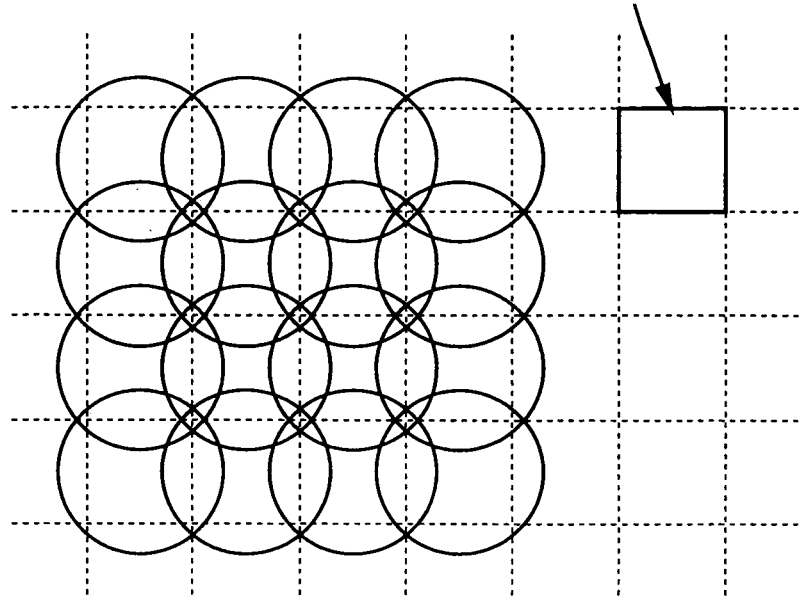
FIGS. 9A and 9B are views illustrating a difference of the output density characteristic between different dot sizes.

FIG. 9A shows a case where the large dots are formed with a duty of 100 percent for a predetermined area. The dot size is sufficiently large to each lattice area that sections one pixel and hence the dot covers the whole area of the pixel, achieving a sufficiently large area factor. In addition, before the printing duty reach 100 percent, this condition that the area factor is sufficiently large is fulfilled, which becomes a main cause that makes the density saturate. Furthermore, since the dot diameter is large, even when at a low duty, the area occupied by the dot includes an excessive portion to the lattice of the one pixel, which becomes a main cause for relatively rapid increase in the density. This is because the printed dot affects not only the corresponding pixel but also surrounding pixels.

Figure 9B:
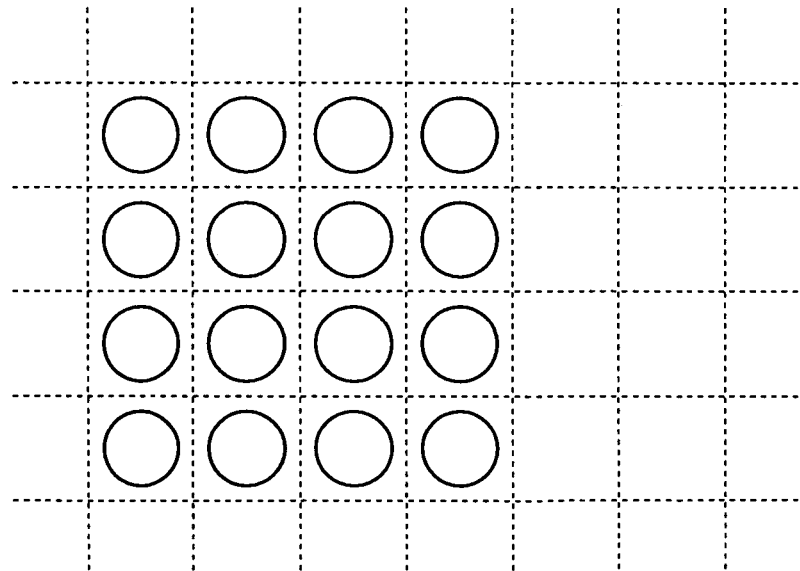

On the other hand, FIG. 9B shows a case where the small dots of a 100 percent duty are formed for a predetermined area. As shown in the figure, the dot size is small to each lattice area that sections one pixel and hence the dot doesn't cover the whole pixel, not achieving a sufficiently large area factor. Therefore, the density increases linearly in proportion to the increase of the duty. This is because the formed dots don't interfere with one another and the size of the dot formed is reflected in the density directly.

In a configuration, as described above, where one printing element can print a plurality of dots each having a different size and with the use of those dots density modulation printing is performed, a density characteristic such as gradation property etc. may be different for each dot size. In this embodiment, proper density correction is performed for each dot size in consideration of this particular respect. That is, this embodiment prepares two density correction tables for one nozzle: the density correction table for the large dot; and the density correction table for the small dot (the same correction tables being applied to each nozzle). Then, for each image data to be printed, which dot is used to print the image data is judged, according to the judgment a proper density correction table is selected for each nozzle to perform proper density correction for the image.

Figure 10:
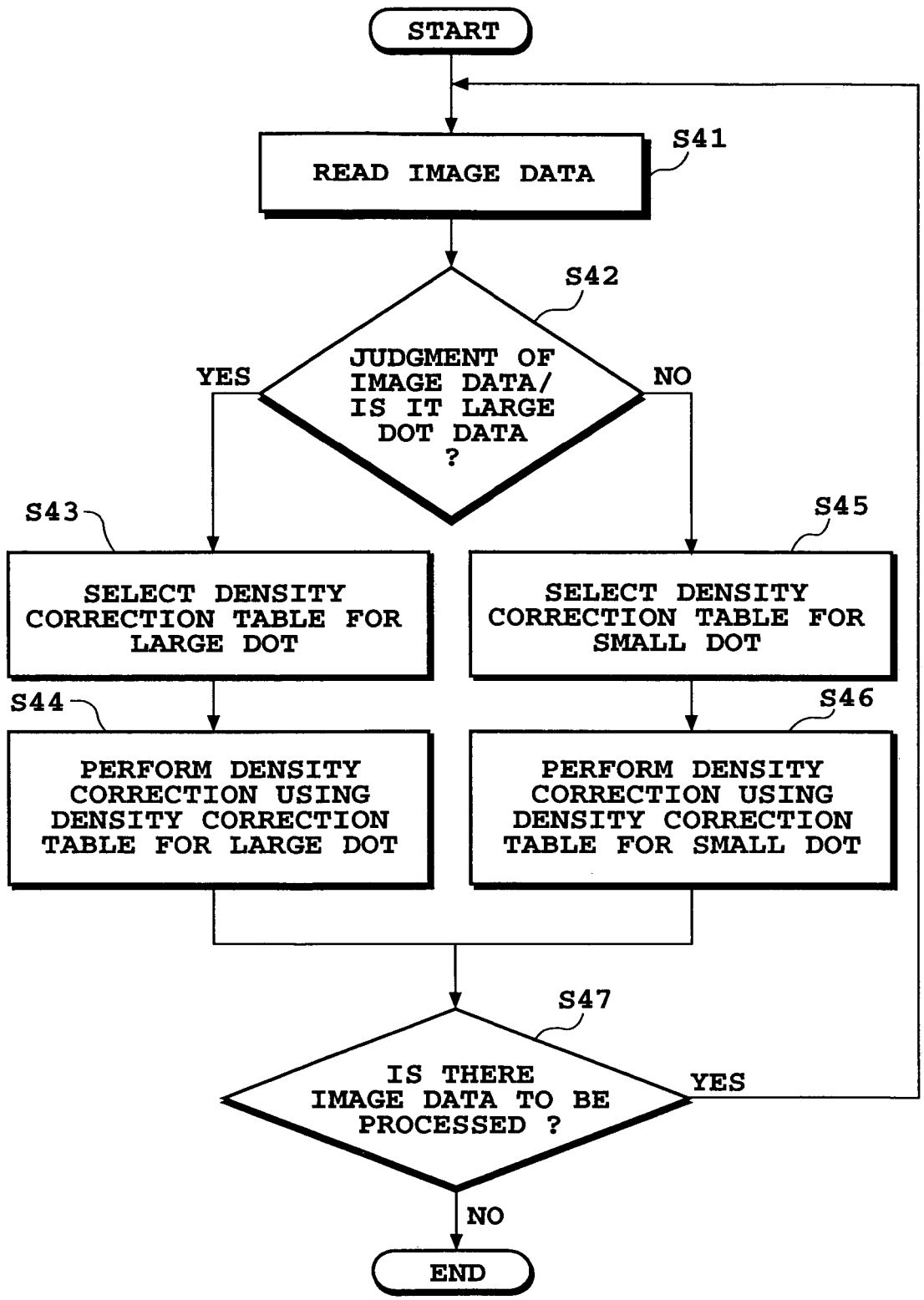
FIG. 10 is a flowchart showing the output $\gamma$ correction processing according to the fourth embodiment of the present invention.

FIG. 10 is a flowchart showing the output γ correction processing of this embodiment executed mainly by the output γ correction processing section 43.

First, at step S41 image data to be processed is read, and then at step S42 whether data is one that should be printed with the large dot or one that should be printed with the small dot is judged based on the image data.

Specifically, this judgment is done based on the image data of C, M, Y, and K colors each consisting of 8-bits that are inputted into the output γ correction processing section 43. More specifically, when a gradation level represented by each 8-bits of image data is not less than a predetermined boundary value, the data is judged to be printed with the large dot. On the other hand, when it is less than the predetermined boundary value, the data is judged to be printed with the small dot.

It should be noted that in this embodiment, quantization processing by the quantization processing section 44 after the processing of this density correction is not the data conversion into 1-bit binary data but the data conversion into 2-bit data, that is, four-valued data. Then the printer 2 to which this quantized data is sent performs processing such that for example, when the data is either "01" or "10," printing is done with the small dot, and when the data is "11," printing is done with the large dot. As is evident from this, the judgment performed by the output γ correction processing section based on the above-mentioned image data is not necessarily coincident with the size of the dot that is actually printed in accordance with this data. Therefore, preferably, the predetermined boundary value in the above-mentioned judgment is determined based on the results obtained when several concrete test patterns are printed beforehand.

At step S42, when the data to be processed is judged to be the data to be printed with the large dot, at step S43 the density correction table for the large dot is selected for each nozzle or for each raster, and then at step S44 the density correction is performed using this density correction table for the large dot. On the other hand, at step S42, when the data to be processed is judged to be the data to be printed with the small dot, at step S45 the density correction table for the small dot is selected, and then at step S46 the density correction is performed using this density correction table for the small dot. After this processing is completed, whether or not the image data remains is judged, and when such data exists, the processing at step S41 and subsequent steps is repeated (step S47).

In the above-mentioned processing, with respect to dots of two sizes the judgment and the correction according to the judgment are performed. However, application of the present invention is not limited to this, the judgment etc. may be done with respect to dots of three or more sizes. For example, in the above-mentioned example, by simultaneously driving two electro-thermal conversion elements of a large size and of a small size, a third dot having a third size larger than the two sizes may be formed. Moreover, as for the setting of the correction table of this embodiment, similarly to the above-mentioned embodiments, a test pattern is printed with different dot sizes and the table data are produced based on the readout results of the test pattern.

As explained in the above, by adopting a scheme where the plurality of density correction tables are prepared for printing elements or for rasters and the density correction is performed using a correction table corresponding to the size of the dot to be printed, the density non-uniformity can be suppressed by taking into account the output density characteristic for each dot mentioned above.

Fifth Embodiment

A fifth embodiment of the present invention is one that the present invention is applied to an apparatus whose printing head can use a plurality of inks each having a different density. More specifically, this embodiment relates to an apparatus where the plurality of inks each having a different density can be supplied to the same printing head, for example, by changing an ink cartridge, and in this case the density correction according to each ink density is performed for each nozzle or for each raster.

In this case, when an ink of a small density (hereinafter referred to as "light ink") is used rather than an ink of a normal density (hereinafter referred to as "dark ink"), variation in an optical reflection density in response to variation in a dye concentration for the light ink is large compared to that for the dark ink.

Figure 11:
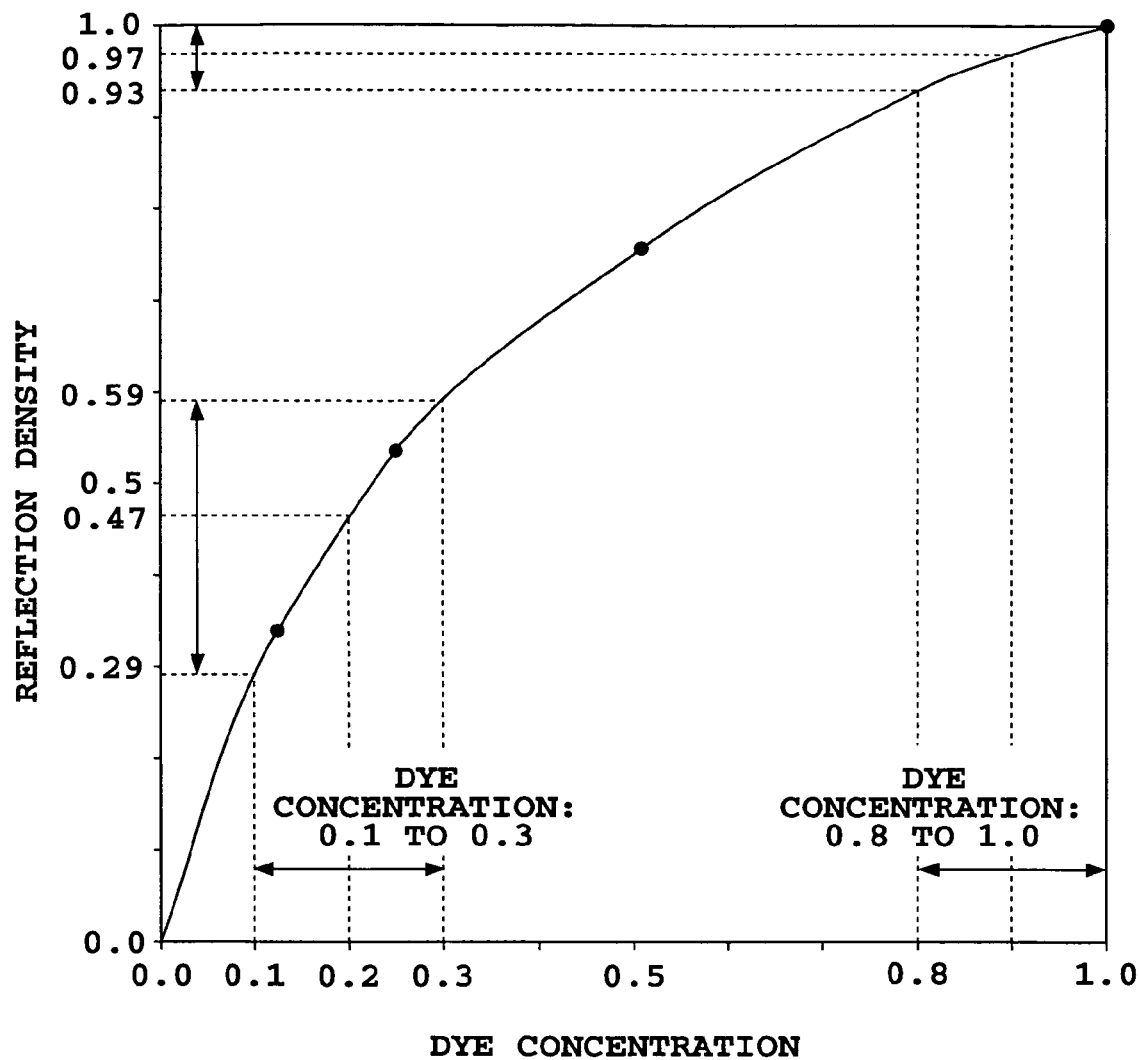
FIG. 11 is a view explaining a difference of changes of reflective density caused by a difference of an ink concentration in a fifth embodiment of the present invention.

FIG. 11 is a view for explaining this phenomenon, representing one example of a characteristic of variation in the reflection density against the variation in the dye concentration. Here, the figure is shown with the dye concentration of the normal dark ink normalized to 1.0 and the reflection density thereof normalized to 1.0. As shown in this figure, when the dye concentration of the dark ink varies in the range of 0.8 to 1.0, the reflection density varies in the range of 0.93 to 1.0, indicating a change width of the reflection density of 0.07. On the other hand, the variation in the reflection density corresponding to the variation in the dye concentration of 0.1 to 0.3 centering on a dye concentration of 0.2 measures 0.30 (=0.59−0.29). Thus, even if the change width of the dye concentration is the same, with respect to the variation in the reflection density to this the light ink is more sensitive. That is, the change width of the reflection density to the change width of the dye concentration for the light ink is larger than that for the dark ink. Therefore, when there exists variation in the ink ejection amount among the nozzles, the density characteristic affected thereby is different for the dark ink and for the light ink. That is, to a slight difference in the ejection amount among the nozzles, the dark ink exhibits a small variation in the density, whereas the light ink exhibits a large variation in the density. Moreover, also in one nozzle, the dark ink and the light ink have different density characteristics. In this embodiment, in the light of this phenomenon, when performing gradation printing where the density of the ink used for each nozzle is different, the density correction in accordance with each ink concentration is performed for each nozzle.

According to this embodiment, the density correction table for the dark ink and that for the light ink are provided for one nozzle (in the case of one-pass printing) or for one raster (in the case of multi-pass printing). Specifically, the table for the light ink has contents instructing that the gradation values of the image are modified in a relatively large degree to the difference of the ejection characteristic among the nozzles, as can be understood from the output density characteristic shown in FIG. 11. On the other hand, the table for the dark ink has contents instructing that the gradation levels of the image are not modified so much as the case of the light ink. Then, which one of the inks is used to print the image to be printed is judged, a proper density correction table is selected in accordance with to the judgment, and the optimum density correction for the ink to be used is performed.

Figure 12:
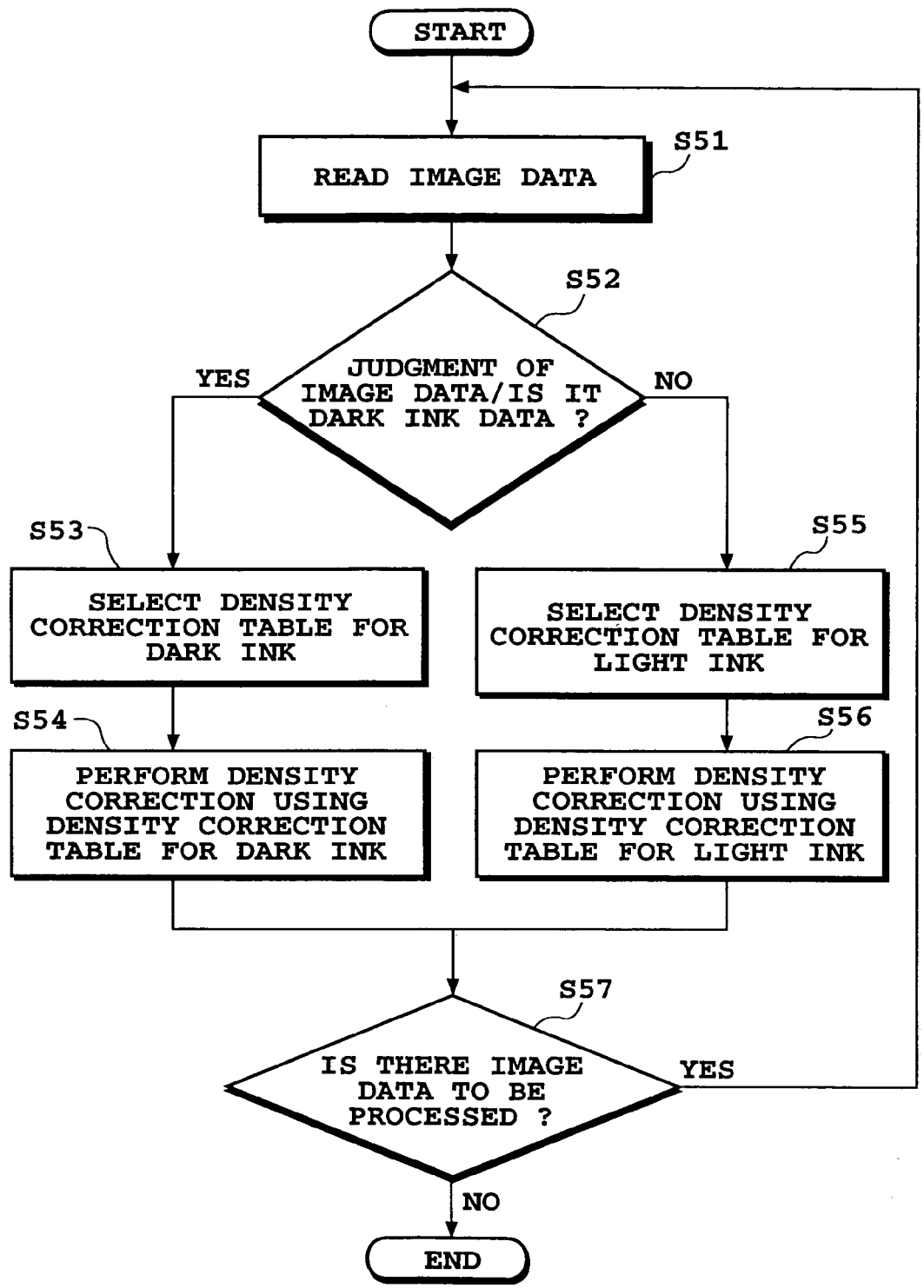
FIG. 12 is a flowchart showing the output $\gamma$ correction processing according to the fifth embodiment of the present invention.

FIG. 12 is a flowchart showing the output γ correction processing of this embodiment executed mainly by the output γ correction processing section 43.

Also similarly in this processing, at step S51 the image data to be processed is read, and then at step S52 whether or not the ink to be used for printing the image is the dark ink is judged based on the image data. This judgment is done based on ink information that is specified for each image beforehand through the printer driver. In this case, the ink information can be tagged to the image data as header information.

At step S52, when the ink information possessed by the image data is information instructing that the dark ink should be used for the printing, at step S53 the density correction table for the dark ink is selected for each nozzle or for each raster, and then in step S54 this selected density correction table for the dark ink is used to execute the density correction of the image data. Moreover, at step S52, when the above-mentioned header information is information instructing that the light ink should be used for printing the image to be printed, at step S55 the density correction table for the light ink is selected for each nozzle or for each raster, and then at step S56 this selected density correction table for the light ink is used to execute the density correction of the above-mentioned image data. Then, similarly to the above-mentioned embodiments, the same processing is repeated until there remains no image data to be printed (step S57).

Setting of the correction tables can be done by printing a predetermined test pattern with the dark ink and with the light ink, respectively, and producing respective table data based on the readout results of respective test patterns.

In the above-mentioned processing, with respect to the inks of the two concentrations the judgment and the density correction according to the judgment are performed. However, the present invention is not limited to this. For example, in the case where inks of three concentrations or more, namely, a dark ink, a medium ink, and a light ink, are used, proper density correction suited for the concentrations of the inks to be used can be performed by executing the similar processing.

As described in the above, by adopting a scheme where the plurality of density correction tables are prepared for each printing element or for each raster and the density correction is performed using the correction table separately in accordance with the concentration of the ink to be used, control of the density non-uniformity can be performed taking into account the output density characteristic for the concentration of each ink. That is, in the case of this embodiment, proper density correction can be performed for the case where used is the ink of a low concentration such that variation in the ejection characteristic among the nozzles affects the reflection density in a relatively large manner as well as for the case where used is the ink of a high concentration such that variation in the ejection characteristic among the nozzles doesn't affect the reflection density so much. In addition, this method can eliminate a bad effect in the image induced by excessive density correction.

As described in the foregoing, each of the first to fifth embodiments uses the printing element of the ink ejection method using thermal energy among various ink-jet methods. However, naturally application of the present invention is not limited to this type of printing element. The present invention can also be applied to cases where printing elements of other ink-jet methods such as one with piezoelectric element, etc. are used or printing elements of other methods than the ink-jet method, for example, thermal ink-transfer printing, thermography, etc. are used. To any case where there exist a plurality of printing conditions (including kinds of images to be printed) such that variation in the printing characteristic among printing elements appears differently in the printed image, the present invention can be applied.

Moreover, the present invention is not necessarily applied only to cases where the variation in the printing characteristic among printing elements exists. The present invention can also be applied to the case where variation in the printing characteristic exists among printing element blocks each consisting of a plurality of printing elements and to the case where variation in the printing characteristic exists between the printing heads.

It should be noted that a configuration that is made by combining at least two of the foregoing embodiments 1 to 5 may be an embodiment of the present invention.

As is evident from the foregoing description, according to the embodiments of the present invention, in the case that a way in which the density appears in an image printed by printing means differs depending upon printing conditions, density correction data according to the way of appearing of each density is prepared for each printing condition, and then density correction is performed using the density correction data corresponding to the printing condition that has been judged. Thereby the density correction suited to the way of appearing of the density can be performed. As a result, when preparing the density correction data in order to suppress a density non-uniformity property which printing means has correspondingly to the printing condition, the very density correction data for effectively suppressing the density non-uniformity can be selected.

As a result, even if the way of letting the density non-uniformity appear is different depending upon the printing conditions, proper density correction can be performed.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An image processing apparatus that performs image processing for generating image data to be used for printing by means of printing means, said apparatus comprising;
    retaining means for retaining density correction data for each of a plurality of printing conditions between which density appears differently in the printing by means of the printing means, the printing conditions being conditions according to which the printing means performs printing and being previously determined;
    judging means for judging as to which printing condition the printing means should perform printing according to when performing image processing, wherein said judging is based on image data to be printed; and
    density correction means for performing density correction on the image data using the density correction data corresponding to the printing condition judged by said judging means, among the density correction data retained by said retaining means,
    wherein the printing means can form dots having different sizes, the printing conditions include printing conditions which differ from each other in dot sizes which are formed in printing performed by the printing means, and the printing means forms the dot of size corresponding to the printing condition, in accordance with the image data.

2. The image processing apparatus as claimed in claim 1, wherein the printing means has a plurality of printing elements and the density correction data retained by said retaining means is retained for each of the plurality of printing elements in said printing means.

3. The image processing apparatus as claimed in claim 1, wherein the printing means has a plurality of printing elements and the density correction data retained by said retaining means is retained for each of rasters of the image data, each of the rasters respectively corresponding to a predetermined number of printing elements among the plurality of printing elements in said printing means.

4. The image processing apparatus as claimed in claim 1, wherein the printing means ejects ink to perform printing.

5. The image processing apparatus as claimed in claim 4, wherein the printing means ejects ink using thermal energy.

6. The image processing apparatus as claimed in claim 1, wherein said judging means judges the printing condition by simulating printing by said printing means.

7. An image processing method that performs image processing for generating image data to be used for printing by means of printing means, said method comprising the steps of:
    preparing density correction data for each of a plurality of printing conditions between which density appears differently in the printing by means of the printing means, the printing conditions being conditions according to which the printing means performed printing and being previously determined;

judging which printing condition the printing means should perform printing according to when performing image processing, wherein said judging is based on image data to be printed; and performing density correction on the image data using the density correction data corresponding to the printing condition judged in said judging step, among the density correction data prepared in said preparing step, wherein the printing means can form dots having different sizes, the printing conditions include printing conditions which differ from each other in dot sizes which are formed in printing performed by the printing means, and the printing means forms the dot of size corresponding to the printing condition, in accordance with the image data.

8. The image processing method as claimed in claim 7, wherein the printing means has a plurality of printing elements and the density correction data prepared in said preparing step is prepared for each of the plurality of printing elements in the printing means.

9. The image processing method as claimed in claim 7, wherein the printing means has a plurality of printing elements and the density correction data prepared in said preparing step is prepared for each of rasters of the image data, each of the rasters respectively corresponding to a predetermined number of printing elements among the plurality of printing elements in the printing means.

10. The image processing method as claimed in claim 7, wherein the printing means ejects ink to perform printing.

11. The image processing method as claimed in claim 10, wherein the printing means ejects ink using thermal energy.

12. The image processing method as claimed in claim 7, wherein said judging step judges the printing condition by simulating printing by the printing means.

* * * * *